United States Patent [19]

Nelson et al.

[11] Patent Number: 4,878,722

[45] Date of Patent: Nov. 7, 1989

[54] WAVELENGTH ENCODED OPTICAL SWITCHES

[75] Inventors: Leonard Y. Nelson; John R. Green; Carol W. Wong, all of Seattle, Wash.

[73] Assignee: Korry Electronics Company, Seattle, Wash.

[21] Appl. No.: 211,437

[22] Filed: Jun. 24, 1988

[51] Int. Cl.$^4$ .............................................. G02B 6/36
[52] U.S. Cl. ............................. 350/96.2; 350/96.13; 350/315; 250/227
[58] Field of Search ............... 350/311, 315, 316, 96.2, 350/96.24, 96.25, 96.13; 250/227

[56] References Cited

U.S. PATENT DOCUMENTS

| | | | |
|---|---|---|---|
| 3,459,951 | 8/1969 | Howarth et al. | 250/226 |
| 3,489,906 | 1/1970 | Dalle-Finn Beer et al. | 250/218 |
| 4,040,741 | 8/1977 | Swift | 356/28 |
| 4,045,667 | 8/1977 | Hanson | 250/226 |
| 4,284,885 | 8/1981 | Swensen | 250/211 |
| 4,308,456 | 12/1981 | Van Der Gaag et al. | 250/226 |
| 4,315,147 | 2/1982 | Harmer | 250/227 |
| 4,345,840 | 8/1982 | Goetz et al. | 350/315 X |
| 4,379,968 | 4/1983 | Ely et al. | 250/229 |
| 4,617,461 | 10/1986 | Subbarao et al. | 250/229 |
| 4,641,026 | 2/1987 | Garcia, Jr. | 250/229 |
| 4,692,612 | 9/1987 | Havel | 250/229 |

*Primary Examiner*—John D. Lee
*Assistant Examiner*—John Ngo
*Attorney, Agent, or Firm*—Christensen, O'Connor, Johnson & Kindness

[57] ABSTRACT

A switch mechanism (11) comprising a red LED light source (13), a filter assembly (15) and a photodetector assembly (17) is disclosed. The photodetector assembly (17) includes two filtered photodetectors (33 and 35) that are aligned with the light source (13) either directly or via a light canal (19). The filtered photodetectors (33 and 35) are designed to detect light in different narrow wavelength bands lying within the band of energy produced by the light source (13). The filter assembly (15) includes a two-position movable element (23) located between the light source (13) and the photodetector assembly (17). The movable element (23) includes two sections (25 and 27) having different light-passing abilities. In one of the movable element positions one section (25) is located between the light source and both filtered photodetectors and in the other movable element position the other section (27) is located therebetween. Preferably, one section (25) is a thin slab of transparent material and the other section (27) is a thin slab of filter material. The transmittance of the filter dye slab (27) is such that the ratio of the energy detected by the filtered photodetectors (33 and 35) when the filter dye slab (27) is located between the light source (13) and the filtered photodetectors (33 and 35) is different than the ratio of the energy detected when the transparent slab (25) is located between the light source (13) and the filtered photodetectors (33 and 35). Thus, the difference in ratios determines the position of the movable element (23).

50 Claims, 8 Drawing Sheets

WAVELENGTH ENCODED OPTICAL SWITCHES

TECHNICAL AREA

This invention is directed to switches and, more particularly, optically based switches.

BACKGROUND OF THE INVENTION

The flow of current through wires and the opening and closing of electrical switch contact create sources of radiation that can be detected by remote equipment. As a result, data created by the opening and closing of electrical switch contacts is remotely detectable. Because such data is remotely detectable, systems that use switches with mechanical contacts either lack privacy, or such systems must be enclosed in housings designed to shield the system so as to prevent the detection of the radiation that is produced when electrical switch contacts are opened and closed. In recent years, communication, control and sensing networks using fiber optic components have been developed. Such networks have the advantage that they do not generate electromagnetic fields and the radio frequency waves associated with such fields. In order for optically based communication, control and sensing networks to be fully secure from remote data detection, it is necessary that the switching elements of such networks be optically based, rather than electro-mechanical based, i.e., comprises mechanical contact switches.

Most existing optically based switches use an amplitude threshold detection technique to denote the "open" and "closed" status of a switch. Unfortunately, variations in optical losses (at connectors in particular) make establishing a threshold detection level for an amplitude modulated optical switch difficult. The present invention is directed to providing optically based switches and networks of such switches that overcome this disadvantage. More specifically, the present invention is directed to providing an optically based switch having an output that accurately denotes the "open" and "closed" status of the switch.

SUMMARY OF THE INVENTION

In accordance with this invention, a wavelength encoded optical switch mechanism comprising a light source, a filter assembly and a photodetector assembly is disclosed. The photodetector assembly includes two photodetectors each with a wavelength separating filter that are aligned with the light source either directly or via light canals, i.e., optical fibers. The filtered photodetectors detect light in different narrow wavelength bands lying within the wavelength band of energy produced by the light source. The filter assembly includes a two-position movable element located between the light source and the filtered photodetectors. The movable element includes two sections, each having different light passing abilities. In one of the movable element positions, one section is located between the light source and both detectors of the photodetector assembly; and, in the other movable element position the other section is located therebetween. The light passing abilities of the two sections are such that the ratio of light energy detected by the two filtered photodetectors is a first value when the first section is located between the light source and both photodetectors and a second value when the other section is located therebetween. More specifically, at least one of the filter sections encodes the output wavelength of the light source prior to being received by the filtered photodetectors. Wavelength encoding is accomplished by the encoding section having different amplitude effects on the wavelength bands of light detected by the two filtered photodetectors. Thus, the detected light ratio is different, depending on which section is located between the light source and the filtered photodetectors.

In accordance with other aspects of this invention, the light source is a solid state light source and the two photodetectors are solid state light detectors that are filtered to detect light in narrow, different wavelength bands lying within the band of energy produced by the light source. Preferably, the light source is a light emitting diode that emits light in the red wavelength band, i.e., the light band lying between approximately 620 and approximately 729 nanometers (nm).

In accordance with further aspects of this invention, one section of the movable element is transparent and the other comprises a filter having a substantially different effect on the amount of energy at the wavelengths received by one of the filtered photodetectors as compared to the wavelengths received by the other filtered photodetector.

In accordance with still further aspects of this invention, preferably, said one section of said movable element is formed of a thin slab of transparent plastic and said other section of said movable element is formed of a thin slab of plastic that contains a dye material, namely a phthalocyanine dye material. In accordance with alternate aspects of this invention, said one section is formed by transparent glass or merely an open passage, and the other section is formed of red filter glass.

In accordance with yet still other aspects of this invention, the light sources of a plurality of switch mechanisms each comprising a light source, a filter assembly and a photodetector assembly of the type described above, are sequentially energized by a multiplexer and the light passing through the filter assembly is sequentially applied in a time related manner to the photodetector assembly. As a result, the status of a plurality of switches are monitored in a time division multiplex manner.

As will be readily appreciated from the foregoing description, the invention provides wavelength encoded switches whose status is determined by the ratio of light energy detected by a pair of wavelength selective detectors. Because the determination of switch status is amplitude ratio based, rather than threshold based, variations in external system component (e.g., connector) optical losses have relatively little effect on the ability to detector switch status information. Variations in system optical losses have very little effect on the ability to detect switch status information because system optical losses are reduced by a nearly constant factor over the narrow wavelength bands that are detected.

BRIEF DESCRIPTION OF THE DRAWINGS

The foregoing features and advantages of this invention will become more readily appreciated as the same becomes better understood by reference to the following detailed description of a preferred embodiment of the invention when taken in conjunction with the accompanying drawings wherein:

FIG. 3 shows the overlap of the spectral emission and transmission curves shown in FIGS. 1 and 2, respectively;

DESCRIPTION OF THE PREFERRED EMBODIMENT

As will be better understood from the following description, this invention comprises: (i) a light source; (ii) a pair of photodetectors filtered to detect light emissions in different portions of the wavelength band of energy produced by the light source; and (iii) a movable switch filter having a different effect on the amount of energy detected by one of the filtered photodetectors as compared to the other filtered detector. As a result, the ratio of energy detected by the pair of filtered photodetectors is different when the movable switch filter is located between the light source and the filtered photodetectors, as compared to when the movable switch filter is not located between the light source and the filtered photodetectors.

Figure 1:
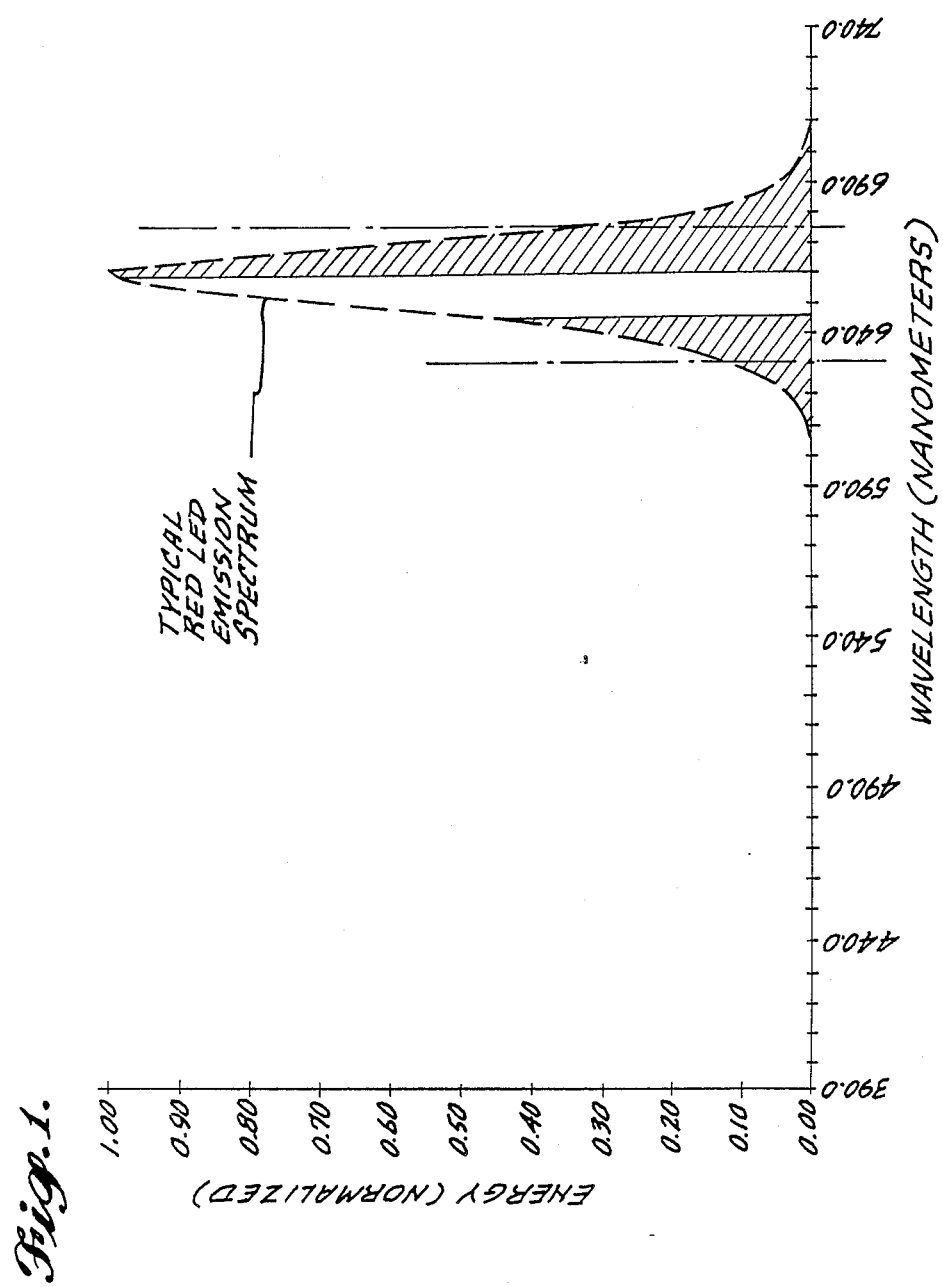
FIG. 1 is a waveform diagram illustrating the energy spectrum of a typical red LED and, by cross-hatching, the portion of the energy detected by a pair of filtered photo detectors centered to detect light in different narrow wavelength bands lying within the band of energy produced by the red LED.

The preferred light source is a red light emitting diode (LED). An LED is an attractive light source for most optical sensor applications because of its small size, narrow beam profile, efficiency and lifetime. Red LEDs are preferred because the bandwidth of the energy produced by a red LED, in contrast to an incandescent light source, is fairly limited (100 nm). FIG. 1 is a waveform of the emissions spectrum of a typical red LED. The LED whose spectrum is illustrated emits energy from approximately 610 nm to 700 nm, centered at 660 nm. FIG. 1 also illustrates the amount of energy detected by a pair of photodetectors, each filtered to have a 30 nm bandwidth, one centered at 630 nm and the other centered at 675 nm. As illustrated by cross-hatching, the filtered photodetector centered at 675 nm receives a substantially larger amount of energy than does the filtered photodetector centered at 630 nm. As will be readily appreciated by those familiar with filtered photodetectors, the cross-hatching shown in FIG. 1 is idealized. Real filtered photodetectors do not have sharp cutoffs at the edges of the filter bandwidth.

Figure 2:
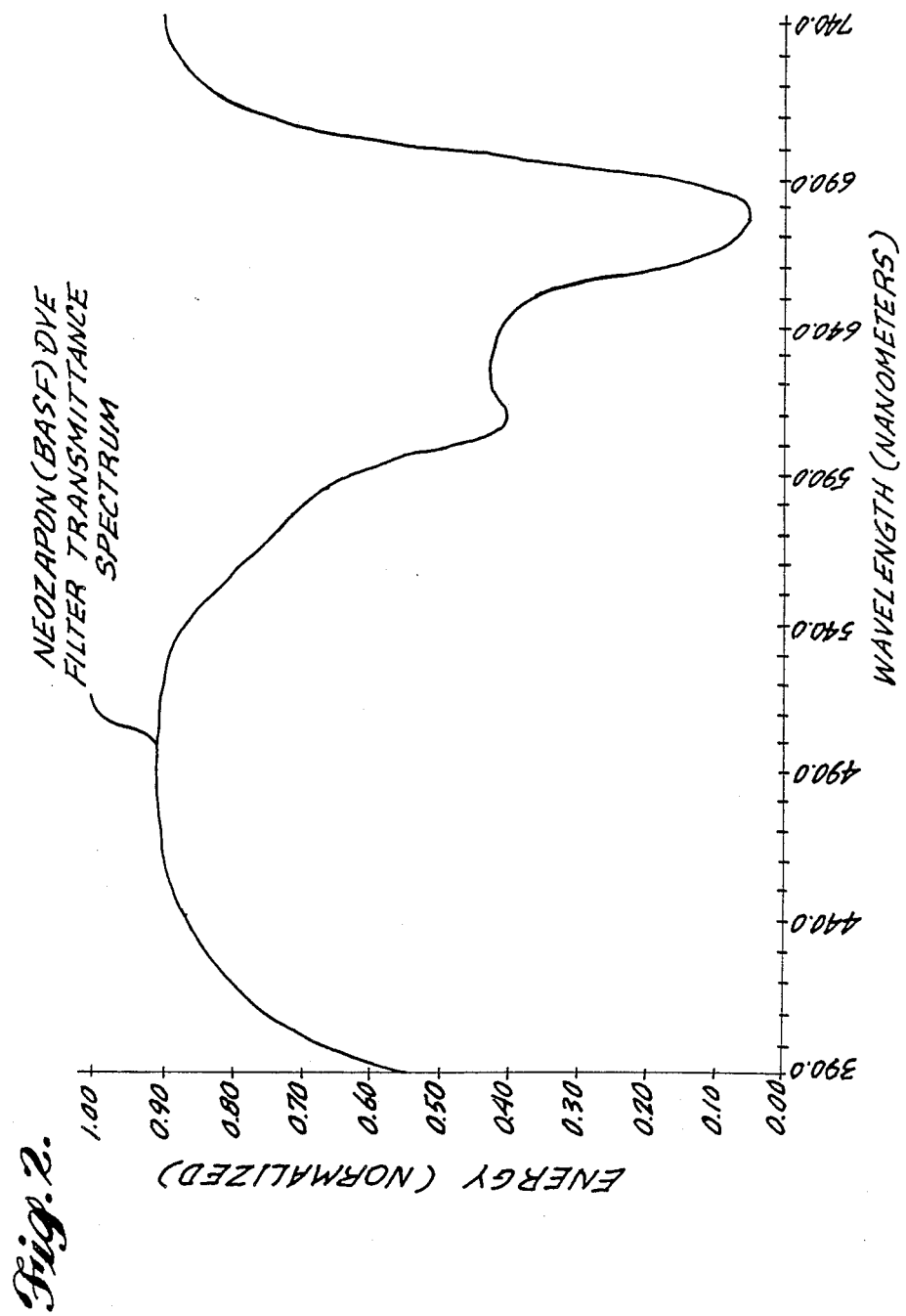
FIG. 2 is a waveform diagram illustrating the transmittance spectrum of a filter formed of a phthalocyanine dye.

A class of dye materials known as phthalocyanines have strong absorption bands in the 600–700 nm range. The transmittance spectrum of a filter formed of such a dye material, chemically modified for solubility in organic polymers and other solvents, is illustrated in FIG. 2. It is pointed out that the transmittance spectrum shown in FIG. 2 includes a dip in the range of the LED spectrum illustrated in FIG. 1, specifically a dip in the 580 nm to 720 nm range. The dip includes a plateau in the approximately 610 nm to 655 nm range followed by deep valley in the approximately 660 nm to 710 nm range. The plateau is approximately centered at 630 nm and the valley is approximately centered at 675 nm, which are nearly the same as the centers of the wavelength bands of the filtered photodetectors illustrated by cross-hatching in FIG. 1.

Figure 3:
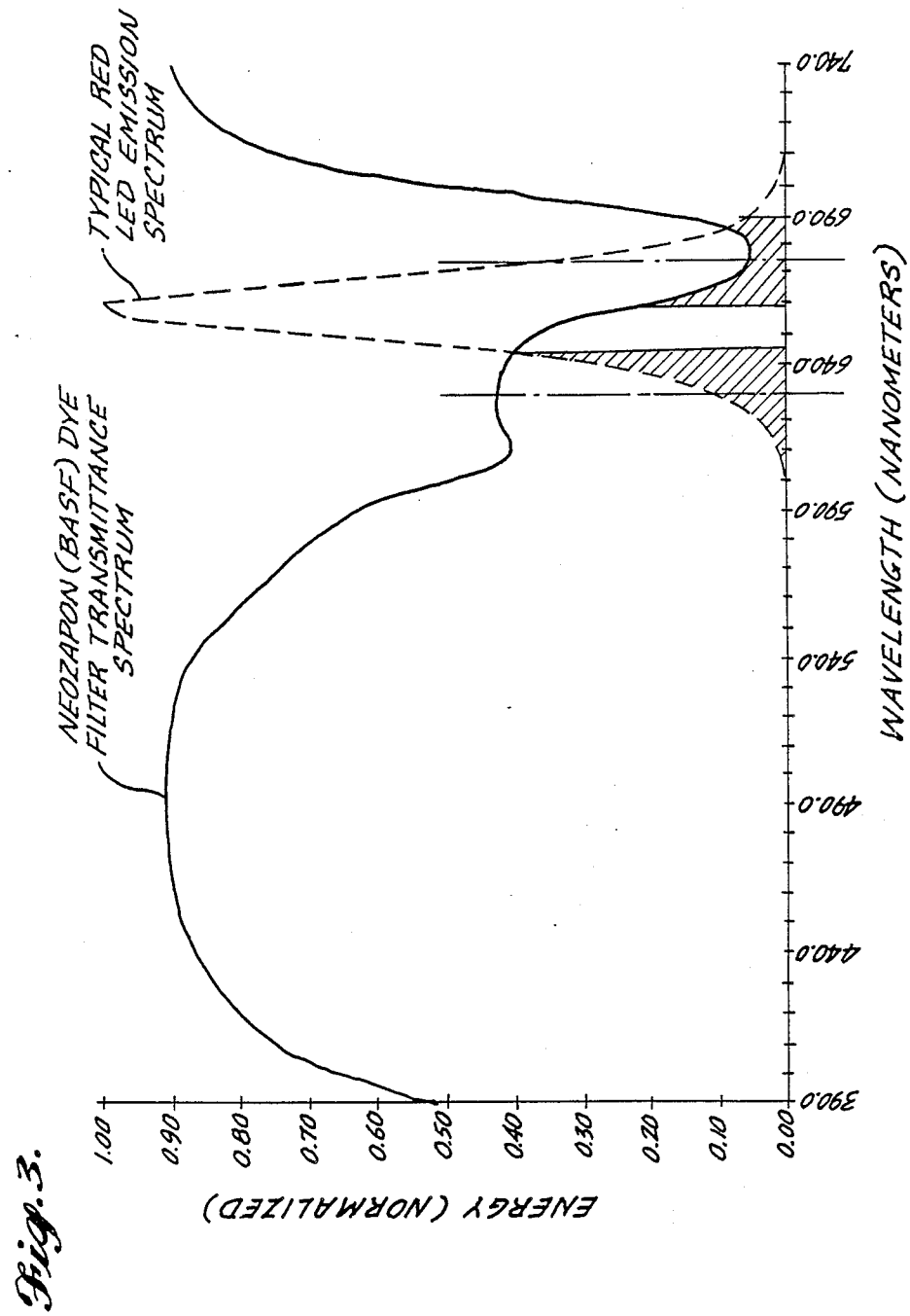
FIG. 3 is a waveform diagram illustrating the emission spectrum of a typical red LED similar to that illustrated in FIG. 1, in combination with a filter formed of a pthalocyanic dye similar to that illustrated in FIG. 2, i.e.

FIG. 3 is a combination of FIGS. 1 and 2. More specifically, FIG. 3 illustrates the effect of placing a pthalocyanic filter having a transmittance spectrum of the type illustrated in FIG. 2 between a light source and a pair of photodetectors each filtered so as to detect light in the limited (e.g., 30 nm) bands illustrated by the cross-hatched areas in FIG. 1 and described above. As can be readily seen from FIG. 3, the phthalocyanine filter substantially decreases the amount of energy received by the photodetector having a filter centered at 675 nm. Contrariwise, the pthalocyanine filter has substantially less effect on the photodetector having a filter centered at 630 nm. In accordance with the invention, this effect of a pthalocyanine filter is used to wavelength encode the light received by the filtered photodetectors. More specifically, the invention makes use of the fact that the ratio of the energy being received by the filtered photodetectors is different when LED light passes through a pthalocyanine filter as compared to the ratio of the energy being received by the filtered photodetectors when the light does not pass through such a filter.

Mathematically, the transmission (T) of energy through a filter at any wavelength is determined by the well known exponential law:

$$t = e^{-\alpha(\lambda)cl} \tag{1}$$

where:

$\alpha(\lambda)$ is the absorption coefficient at the wavelength $\lambda$;

c is the dye concentration; and l is the absorption path length.

As noted above, this invention takes advantage of the unequal transmission of energy by a filter that includes a phthalocyanines dye. More specifically, this invention provides a switch that takes advantage of the fact that the ratio of the energy detected by two detectors band filtered in the manner illustrated in FIG. 1 and described above is one value when a phthalocyanine filter is located between a light source and the pair of filtered photodetectors and a second value when a phthalocyanine filter is not located between the light source and the pair of filtered photodetectors. The ratio difference is utilized to denote the status of a mechanically actuated switch. Because the ratio of wavelength dependent energy amplitude (as opposed to comparing a detected amplitude value with a threshold value) forms the basis for switch position detection, switches formed in accordance with the invention are relatively insensitive to light amplitude changes in components external to the switch.

Figure 4:
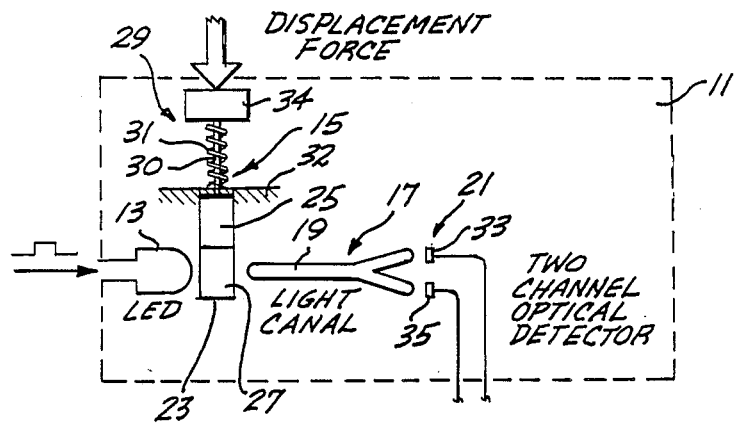
FIG. 4 is a pictorial diagram of a wavelength modulated optical switch formed in accordance with the invention in a first position.
Figure 5:
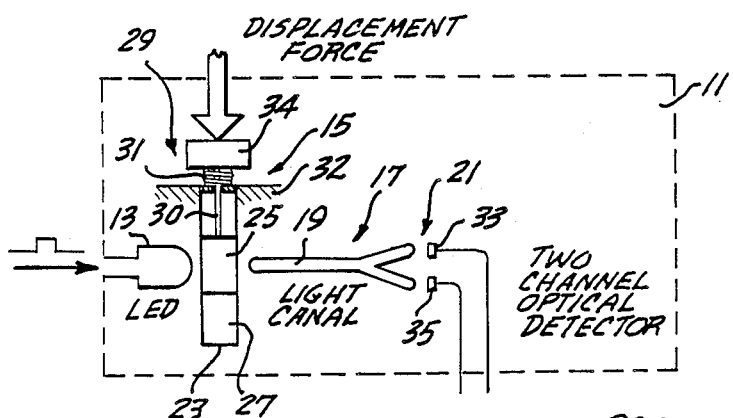
FIG. 5 is a pictorial diagram of the wavelength modulated optical switch illustrated in FIG. 4 in a second position.

FIGS. 4 and 5 are simplified pictorial diagrams illustrating a two-position, wavelength encoded optical swtich 11 formed in accordance with the invention. FIG. 4 illustrates the switch 11 in one position and FIG. 5 illustrates the switch in the other position. The wavelength encoded optical switch 11 illustrated in FIGS. 4 and 5 comprises: a red LED 13; a filter assembly 15; and, a detector assembly 17.

The detector assembly 17 includes a light canal 19, i.e., an optical fiber, and a two channel optical detector 21. The two-channel optical detector 21 includes a pair of filtered photodetectors 33 and 35 located at one end of the light canal 19. Each filtered photodetector is designed to detect a narrow band of energy in a different path of the energy spectrum emitted by the red LED 13. The filtered photodetectors may be formed by a photo diode in combination with a narrow band filter, or by a filtered silicon cell, for examples.

The filter assembly 15 includes a movable element 23 located in the light path between the red LED 13 and the other end of the light canal 19 and a spring loaded plunger 29 for moving the movable element 23 between two positions, one of which is shown in FIG. 4 and the other of which is shown in FIG. 5. More specifically, the movable element 23 includes two sections 25 and 27 each having different light passing abilities, i.e., different light transmittance bands. Preferably, the first section 25 is a thin slab of transparent plastic and the second section 27 is a thin slab of plastic containing a filter dye. If desired, both sections 25 and 27 of the movable element can be poured (cast) one on top of the other, which binds them mechanically and provides a machinable blank. The movable element 23 is mounted such that the sections are movable in a direction transverse to the direction of the light path between the red LED 13 and the light canal 19. As a result, either section 25 or 27 can be located between the red LED 13 and the light canal 19. FIG. 4 illustrates the second or filter section 27 located between the red LED 13 and the light canal 19 and FIG. 5 illustrates the first or transparent section 25 in this position.

The movable element 23 is moved by applying a displacement force to the spring loaded plunger 29. The spring loaded plunger includes a shaft 30 extending outwardly from one edge of the movable element 23. Mounted on the shaft 30, between a support 32 and a key 34 is a coil spring 31. When no displacement force is present, the coil spring 31 of the spring loaded plunger 29 applies a force against the key 34 that positions the filter section 27 of the movable element 23 between the red LED 13 and the light canal 19. When a displacement force of suitable magnitude is applied to the key 34, the spring 31 is compressed, resulting in the transparent section 25 being located between the red LED 13 and the light canal 19.

The filtered photodetector elements 33 and 35 of the two-channel optical detector 21 are connected to a ratio detecting circuit that measures the amount of energy detected by each of the filtered photodetectors and determines the ratio therebetween. Since the ratio of the detected energy determines which of the two sections of the movable element 23 is located between the red LED and the light canal 19, the ratio determines the state of the wavelength encoded swtich 11, i.e., whether or not a displacement force is being applied to the key 34.

In one actual embodiment of the invention, the movable element 23 included one section formed of a thin transparent cast epoxy slab and the other section formed of a thin cast epoxy slab containing a suitable dye material, specifically Neozapon Blue 807 produced by BASF Corporation, Parsippany, N.J. The detectors were formed by positioning a narrow band (e.g., 30 nm) optical filter in front of each one of a pair of silicon cells. One filter had a center wavelength of 630 nm and the other filter had a center wavelength of 675 nm. The red LED and an emission spectrum of the type illustrated in FIG. 1 and the filter portion of the movable element had a transmittance spectrum of the type illustrated in FIG. 2. Which section of the movable element was located between a red LED and the filtered photodetectors was determined by computing the ratio of the energy received by the 675 nm filtered photodetector to that received by the 630 nm filtered photodetector. As shown in FIG. 1 the ratio of 675 nm filtered energy to 630 nm filtered energy is approximately 3:1 when the transparent section is located between the red LED and the filtered photodetectors; and, as shown in FIG. 3 this ratio is approximately 1:1 when the filter section is located therebetween.

Figure 6:
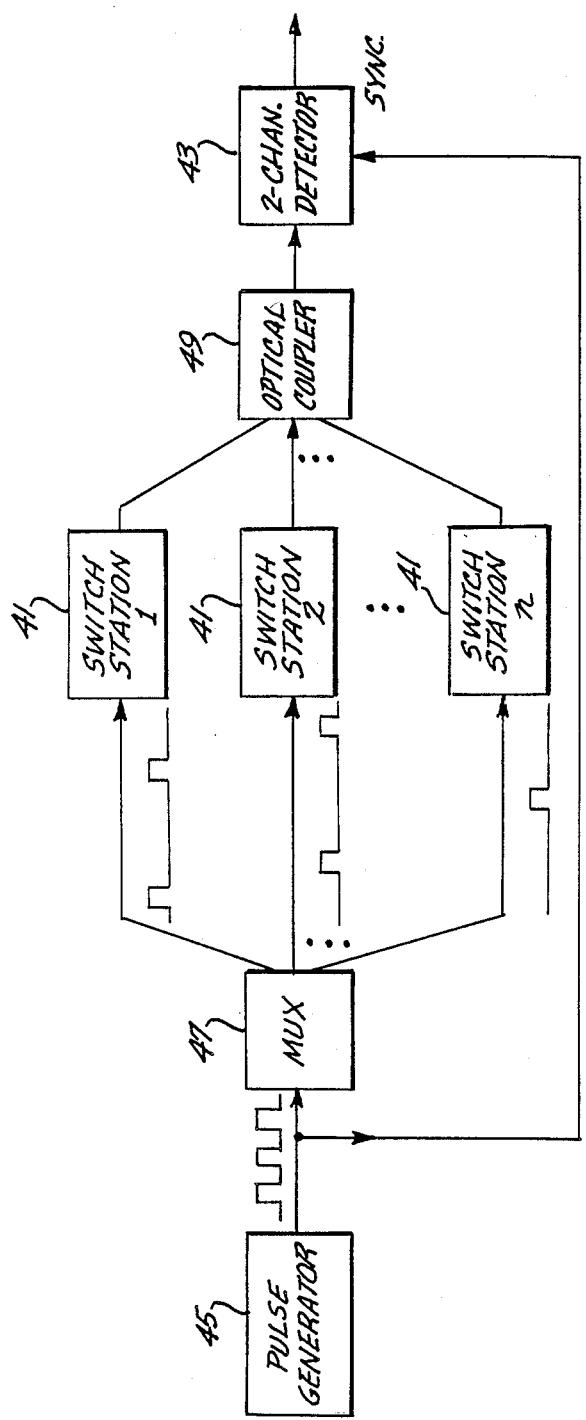
FIG. 6 is a block diagram of a plurality of wavelength modulated optical switches formed in accordance with the invention in combination with a multiplexer switch status interrogation system.

Rather than the two channel detector monitoring the position of a single movable element and, thus, the status of a single switch, a single two-channel filtered photodetector assembly can be utilized to monitor the status of a plurality of switch stations each formed in accordance with the invention. FIG. 6 illustrates such an arrangement. More specifically, FIG. 6 is a block diagram comprising a plurality of wavelength encoded optical switch stations 41, all formed in accordance with the invention, whose output is monitored by a single two-channel filtered photodetector assembly 43. The system illustrated in FIG. 6 also includes a pulse generator 45 and a multiplexer 47. The pulse generator 45 produces a chain of pulses. The pulses are applied to the input of a multiplexer 47 and to a synchronizing input of a two-channel detector 43. In a conventional manner the multiplexer 47 produces a series of chains of pulses, one chain applied the light source, i.e., the red LED 13, of each of the switch stations 41. The chains of pulses produced by the multiplexer are timed such that the light source of only one of the plurality of switch stations is enabled or triggered (i.e., energized) at a time. Preferably, the switch station light sources are triggered sequentially in numerical order 1 through N, where N is the total number of switch stations. After the light source of the Nth switch station 41 has been triggered by a pulse, the same triggering sequence is repeated after an optical wait state. The light canals 19 of the switch stations 41 are connected by an optical coupler 49 to the two-channel photodetector assembly 43. Each time the two-channel photodetector assembly 43 receives a pulse, which is synchronized with the triggering of the light source of one of the switch stations 41, the two-channel photodetector assembly 43 is enabled to allow its two filtered photodetectors to "read" the output of the optical coupler. Thus, the two-channel photodetector assembly reads the state of the interrogated switch station i.e. the switch station whose light source was simultaneously triggered. As with the single switch embodiment of the invention illustrated in FIGS.

4 and 5, the output of the two-channel filtered photodetector assembly 43 contains the ratio information necessary to determine which section of the movable element is located between the energized light source and the light channel connected to the optical coupler 49.

Obviously, the frequency of the pulses that energize or trigger the light sources is a function of the number of switch stations and the response time of the stations. A 25 station system with a pulse rate of 2.5 KHz will have an available response time of 10 milliseconds. Two stations would be considered activated at the same time only in the event the keys of the two stations were pressed within 10 milliseconds of each other.

Rather than being operated synchronously as illustrated in FIG. 6, a multiple switch station system can be operated asynchronously by extending the wavelength encoding concept of the invention. More specifically, in order for the system to be run asynchronously, each section of each movable element would have to be a filter and each filter section would have to have a different transmission ratio. This can be readily accomplished by varying the dye concentration values c, or by varying the filter thickness l. When this is done, which switch stations has been interrogated as well as the status of the switch station is determined by the ratio output of the two-channel filtered photodetector assembly.

Figure 7:
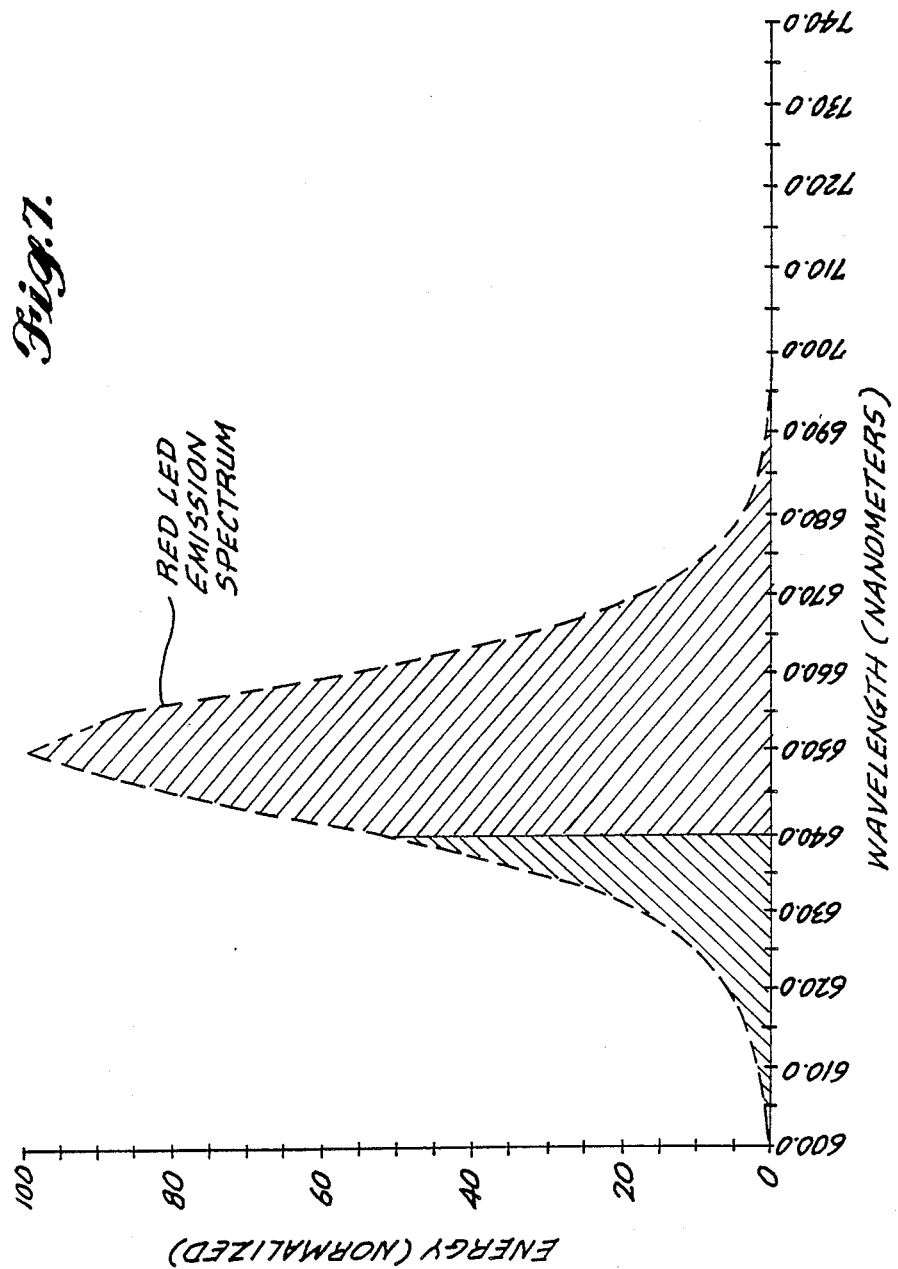
FIG. 7 is a waveform diagram similar to FIG. 1 illustrating the energy spectrum of a red LED and, by cross-hatching, the portion of the energy detected by a pair of filtered photo detectors centered to detect light in different narrow wavelength bands lying within the band of energy produced by the red LED.

Like FIG. 1, FIG. 7 is a waveform of the emissions spectrum of a red LED. The LED whose spectrum is illustrated emits energy from approximately 600 nm to 700 nm, centered at 650 nm. FIG. 7 also illustrates, by cross-hatching, the amount of energy detected by a pair of photodetectors, one filtered to have a 30 nm bandwidth centered at 625 nm and the other filtered to have a 60 nm centered at 670 mm. More specifically, the cross-hatching areas of FIG. 7 illustrate the amount of energy that the filtered photodetectors receive from the LED. As illustrated in FIG. 7, the filtered photodetector bandwidth centered at 670 nm receives a substantially larger amount of energy than does the filtered photodetector centered at 625 nm. As will be readily appreciated by those familiar with filtered photodetectors, the cross-hatching shown in FIG. 7 is idealized. Real filtered photodetectors do not have the sharp cut-off at the edges of the filter bandwidth, such as shown at 640 nm.

Figure 8:
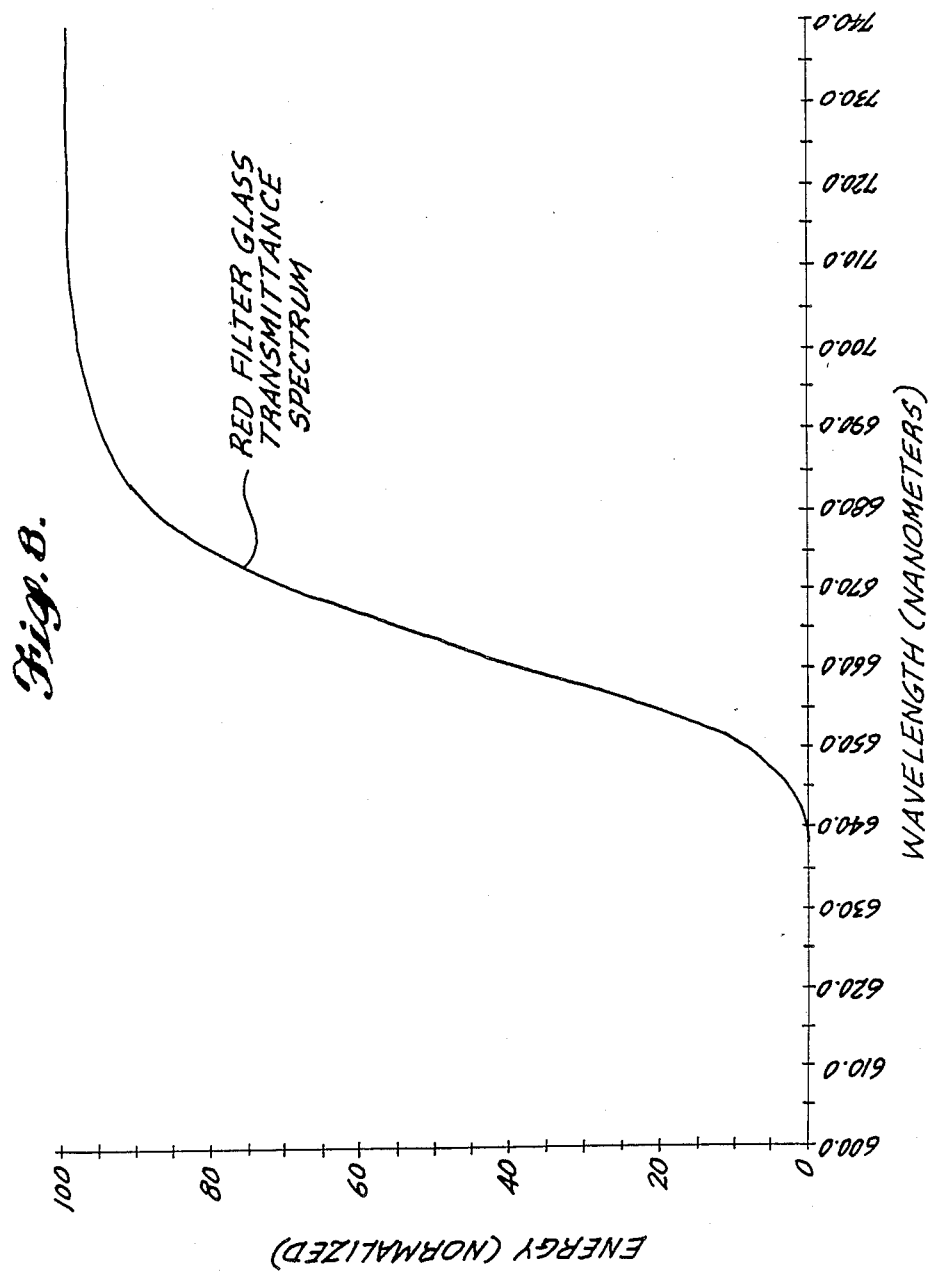
FIG. 8 is a waveform diagram illustrating the transmittance spectrum of a filter formed of red glass; and, FIG. 9 is a waveform diagram illustrating the emission spectrum of a typical red LED similar to that illustrated in FIG. 7 in combination with a filter formed of red glass similar to that illustrated in FIG. 8, i.e.

The absorption bands of red filter glass starts at about 640 nm and rapidly approaches maximum cut-off as shown by the red glass filter transmittance spectrum illustrated in FIG. 8. More specifically, FIG. 8 illustrates the transmittance spectrum of a 2.5 millimeter (mm) thick piece of R-66 red filter glass sold by Hoya Corporation, Tokyo, Japan.

Figure 9:
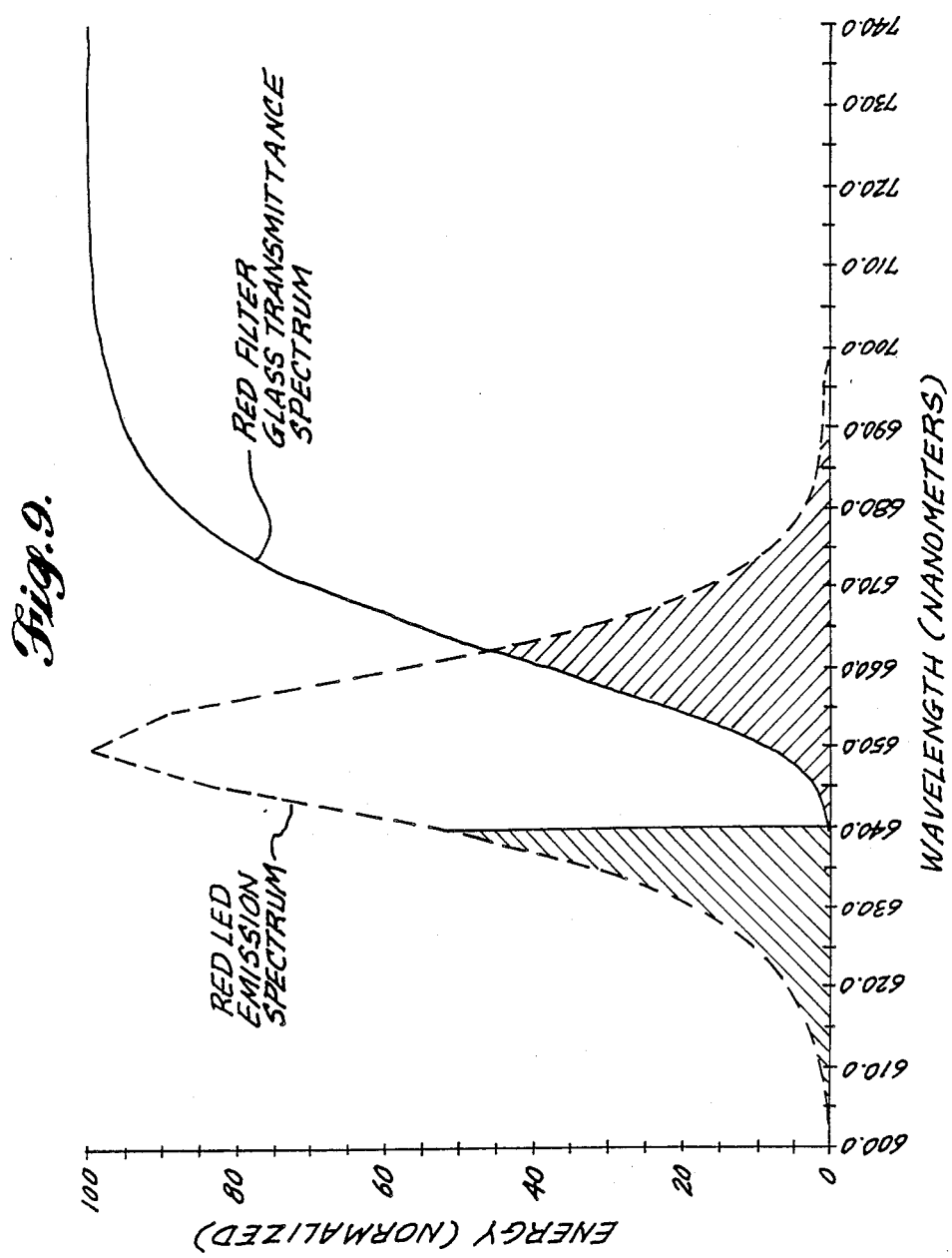
FIG. 9 shows the overlap of the spectral transmission curve shown in FIGS. 7 and 8, respectively.

FIG. 9 is a combination of FIGS. 7 and 8. More specifically, FIG. 9 illustrates the effect of placing a red glass filter having a transmittance spectrum of the type illustrated in FIG. 8 between a light source and a pair of photodetectors each filtered so as to detect light in the limited bands illustrated in FIG. 7 and described above. As can be readily seen from FIG. 9, the red glass filter substantially decreases the amount of energy received by the photodetector having the 60 nm passband centered at 670 nm. Contrariwise, the red glass filter has substantially little effect on the photodetector having the 30 nm passband centered at 625 nm. In accordance with the invention, this effect of a red glass filter, like a pthalocyanine filter, can be used to wavelength encode the light received by the filtered photodetectors. As shown in FIG. 7, the ratio of the 670 nm centered filtered energy to the 625 nm centered filtered energy is approximately 5:1 when transparent glass is located between a red LED and the filtered photodetectors; and, as shown in FIG. 9 this ratio is approximately 1:1 when the red filter glass is located therebetween.

As will be readily appreciated from the foregoing description, the invention provides a wavelength encoded optical switch. More specifically, the invention provides a switch whose "open" or "closed" state is determined by how much, if any, of the light emitted by a light source is attenuated in two different frequency bands. The invention relies on the overlap of the emission spectrum of the light source, i.e., the red LED, and the absorption bands of a switch filter, preferably formed either by adding phthalocyanine dye molecules to a plastic support substrate, or by red filter glass. The filter is used as a flag to intercept the LED beam in the switch mechanism. Instead of comparing a measured amplitude value to a threshold value, the invention compares the change in the ratio of wavelength dependent energy amplitudes, i.e., the invention compares the amplitude of measured energy falling in two different narrow wavelength bands that fall within the wavelength band of the light source. The switch filter, the light source and the detected wavelength bands are chosen such that the switch filter affects the amplitude of the energy detected by one of the detectors more than the other detector. In addition to having the advantage of not producing electromagnetic fields and the radio waves associated with such fields, the invention has the further advantage of being relatively insensitive to light source amplitude fluctuations and variations in the light transmissability of an overall optical network.

While preferred embodiments of the invention have been illustrated and described, it will be appreciated that various changes can be made therein without departing from the spirit and scope of the invention. For example, rather than utilizing a light canal to convey the LED light that passes through the movable element to the two-channel filtered photodetector assembly, the two-channel filtered photodetector asssembly can be located immediately adjacent the movable element. Further, while the phthalocyanine dye noted above, i.e., Neozapon Blue 807 is preferred, other dyes can be utilized, provided they have the same effect, i.e., a dissimilar affect on the magnitude of light emitted by the light source in the two different bands detected by a pair of detectors. Further, while a narrow beam light source is preferred, obviously, a wider beam light source can be utilized, if desired, provided the interaction between the light source and the movable switch filter has a detectable dissimilar effect on the light detected in the two detection bands. Further, while it is preferred that one of the sections of the movable element in single switch and synchronous multiple switch embodiments of the invention be transparent and the other include a filter, obviously, the transparent section can include a filter having a different transmittance spectrum if desired. Either the filter dye can be different or the same dye can be used and the concentration or thickness changed so that a different ratio is detected when the different filter elements are located between the light source and the two-channel filtered photodetector assembly. Consequently, within the scope of the appended claims, it is to be understood that the invention can be practiced otherwise than as specifically described herein.

The embodiments of the invention in which an exclusive property or privilege is claimed are defined as follows:

1. A wavelength encoded optical switch comprising: an electrically energized light source; a two-channel photodetector including two light detectors filtered to detect light in two different wavelength bands lying within the wavelength band of light produced by said electrically energized light source when said electrically energized light source is energized; a movable element located between said electrically energized light source and said two-channel photodetector, said movable element including at least two sections, at least one of said two sections comprising a filter having a dissimilar transmissivity effect on light lying in said two different wavelength bands detected by said two light detectors; and, positioning means for selectively positioning one or the other of said two sections of said movable element between said electrically energized light source and said two-channel photodetector.

2. A wavelength encoded optical switch as claimed in claim 1, wherein said electrically energized light source creates a beam of red light when energized.

3. A wavelength encoded optical switch as claimed in claim 1 or 2, including a light canal for conveying light from the side of said movable element remote from the side on which said electrically energized light source is located to said two-channel photodetector.

4. A wavelength encoded optical switch as claimed in claim 1, wherein one section of said movable element is transparent and wherein said other section comprises said filter having a dissimilar transmissivity effect on light lying in said two different wavelength bands detected by said two light detectors.

5. A wavelength encoded optical switch as claimed in claim 4, wherein said electrically energized light source creates a beam of red light when energized.

6. A wavelength encoded optical switch as claimed in claim 4 or 5, including a light canal for conveying light from the side of said movable element remote from the side on which said electrically energized light source is located to said two-channel photodetector.

7. A wavelength encoded optical switch as claimed in claim 4, wherein said transparent section is formed of a thin slab of transpaent plastic and wherein said filter section is formed of a thin slab of plastic containing a filter dye.

8. A wavelength encoded optical switch as claimed in claim 7, wherein said electrically energized light source creates a beam of red light when energized.

9. A wavelength encoded optical switch as claimed in claim 7 or 8, including a light canal for conveying light from the side of said movable element remote from the side on which said electrically energized light source is located to said two-channel photodetector.

10. A wavelength encoded optical switch as claimed in claim 7, wherein said filter dye is a phthalocyanine dye.

11. A wavelength encoded optical switch as claimed in claim 10, wherein said electrically energized light source creates a beam of red light when energized.

12. A wavelength encoded optical switch as claimed in claim 10 or 11, including a light canal for conveying light from the side of said movable element remote from the side on which said electrically energized light source is located to said two-channel photodetector.

13. A wavelength encoded optical switch as claimed in claim 11, wherein said electrically energized light source is a red light emitting diode.

14. A wavelength encoded optical switch as claimed in claim 13, wherein said red light emitting diode emits energy in a wavelength band extending from approximately 610 nm to approximately 700 nm, centered at 660 nm.

15. A wavelength encoded optical switch as claimed in claim 14, wherein each of said detectors has a bandwidth of approximately 30 nm.

16. A wavelength encoded optical switch as claimed in claim 15, wherein the bandwidth of one of said detectors is centered at about 630 nm and the bandwidth of the other is centered at about 675 nm.

17. A wavelength encoded optical switch as claimed in claim 16, wherein said filter section has very little effect on the amount of energy detected by said detector centered at about 630 nm and a substantial reduction in the light energy received by said detector centered at about 675 nm.

18. A wavelength encoded optical switch as claimed in claim 4, wherein said transparent section is formed of a thin slab of transparent material and wherein said filter section is formed of a thin slab of red filter glass.

19. A wavelength encoded optical switch as claimed in claim 18, wherein said electrically energized light source creates a beam of red light when energized.

20. A wavelength encoded optical switch as claimed in claim 18 or 19, including a light canal for conveying light from the side of said movable element remote from the side on which said electrically energized light source is located to said two-channel photodetector.

21. A wavelength encoded optical switch as claimed in claim 20, wherein said electrically energized light source is a red light emitting diode.

22. A wavelength encoded optical switch as claimed in claim 21, wherein said red light emittion diode emits energy in a wavelength band extending from approximately 600 nm to approximately 700 nm, centered at 650 nm.

23. A wavelength encoded optical switch as claimed in claim 22, wherein one of said detectors has a bandwidth of approximately 30 nm and the other has a bandwidth of approximately 60 nm.

24. A wavelength encoded optical switch as claimed in claim 23, wherein the bandwidth of said one of said detectors is centered at about 625 nm and the bandwidth of said other of said detectors is centered at about 670 nm.

25. A wavelength encoded optical switch as claimed in claim 24, wherein said filter section has very little effect on the amount of energy detected by said detector centered at about 625 nm and a substantial reduction in the light energy received by said detector centered at about 670 nm.

26. A wavelength encoded optical switch system comprising:
(A) a plurality of switch stations, each of said switch stations comprising:
(1) a light source for generating a beam of light energy;
(2) a movable element located in the beam of light produced by said light source, said movable element including at least two sections, at least one of said two sections comprising a filter having a dissimilar transmissivity effect on light produced by said light source in two different wavelength bands lying within the wavelength band of light produced by said light source; and (3) positioning means for selectively positioning one or the other of said two sections of said movable element in the beam of light produced by said light source;

(B) pulse generating means for generating a plurality of trigger pulses and selectively applying said trigger pulses to said light sources of said switch stations such that only one of said light sources receives a trigger pulse at one same point in time;

(C) a two-channel photodetector including two light detectors configured to detect light in the two different wavelength bands lying within the wavelength band of light produced by said light source; and, (D) optical coupling means for conveying light from the side of said removable element remote from said light source to said two-channel detector.

27. A wavelength encoded optical switch system as claimed in claim 26 wherein said pulsing means comprises a pulse generator and a multiplexer for sequentially applying said trigger pulses to said light sources of said switch stations.

28. A wavelength encoded optical switch system as claimed in claim 27, wherein the output of said pulse generator is connected to said two-channel photodetector for synchronizing said two-channel photodetector such that said two-channel photodetector is enabled to receive light from said optical coupler when one of said switch stations receives a trigger pulse from said multiplexer.

29. A wavelength encoded optical switch system as claimed in claim 26, 27 or 28, wherein said light source of each of said switch stations creates a beam of red light when energized.

30. A wavelength encoded optical switch system as claimed in claim 29, wherein said light source of each of said switch station is a red light emitting diode.

31. A wavelength encoded optical switch system as claimed in claim 26, 27 or 28, wherein one section of said movable element of each of said switch stations is transparent and wherein said other section comprises said filter having a dissimilar transmissivity effect on light lying is said two different wavelength bands detected by said two light detectors.

32. A wavelength encoded optical switch system as claimed in claim 31, wherein said light source of each of said switch stations creates a beam of red light when energized.

33. A wavelength encoded optical switch system as claimed in claim 32, wherein said light source of each of said switch station is a red light emitting diode.

34. A wavelength encoded optical switch system as claimed in claim 31, wherein said transparent section of each of said movable elements is formed of a thin slab of transparent plastic and wherein said filter section of each of said movable elements is formed of a thin slab of plastic containing a filter dye.

35. A wavelength encoded optical switch system as claimed in claim 34, wherein said light source of each of said switch stations creates a beam of red light when energized.

36. A wavelength encoded optical switch system as claimed in claim 35, wherein said light source of each of said switch station is a red light emitting diode.

37. A wavelength encoded optical switch system as claimed in claim 34, wherein said filter dye is a phthalocyanine dye.

38. A wavelength encoded optical switch system as claimed in claim 37, wherein said light source of each of said switch stations creates a beam of red light when energized.

39. A wavelength encoded optical switch system as claimed in claim 38, wherein said light source of each of said switch station is a red light emitting diode.

40. A wavelength encoded optical switch system as claimed in claim 39, wherein said red light emitting diode emits energy in a wavelength band extending from approximately 610 nm to approximately 700 nm, centered at 660 nm.

41. A wavelength encoded optical switch system as claimed in claim 40, wherein each of said detectors has a bandwidth of approximately 30 nm.

42. A wavelength encoded optical switch system as claimed in claim 41, wherein the bandwidth of one of said detectors of each switch station is centered at about 630 nm and the bandwidth of the other of said detectors of each switch station is centered at about 675 nm.

43. A wavelength encoded optical switch system as claimed in claim 42, wherein said filter section of each switch station has very little effect on the amount of energy detected by the detector centered at about 630 nm and a substantial reduction in the light energy received by the detector centered at about 675 nm.

44. A wavelength encoded optical switch system as claimed in claim 31, wherein said transparent section of each of said movable elements is formed of a thin slab of transparent material and wherein said filter section of each of said movable elements is formed of a thin slab of red filter glass.

45. A wavelength encoded optical switch system as claimed in claim 44, wherein said light source of each of said switch stations creates a beam of red light when energized.

46. A wavelength encoded optical switch system as claimed in claim 45, wherein said light source of each of said switch station is a red light emitting diode.

47. A wavelength encoded optical switch system as claimed in claim 46, wherein said red light emitting diodes emit energy in a wavelength band extending from approximately 600 nm to approximately 700 nm, centered at 650 nm.

48. A wavelength encoded optical switch system as claimed in claim 47, wherein one of said detectors of each switch station has a bandwidth of approximately 30 nm and the other of said detectors of each switch station has a bandwidth of approximately 60 nm.

49. A wavelength encoded optical switch system as claimed in claim 48, wherein the bandwidth of said one of said detectors of each switch station is centered at about 625 nm and the bandwidth of said other of said detectors of each switch station is centered at about 670 nm.

50. A wavelength encoded optical switch system as claimed in claim 49, wherein said filter section each switch station has very little effect on the amount of energy detected by the detector centered at about 625 nm and a substantial reduction in the light energy received by the detector centered at about 670 nm.

* * * * *

UNITED STATES PATENT AND TRADEMARK OFFICE
CERTIFICATE OF CORRECTION

PATENT NO. : 4,878,722

DATED : November 7, 1989

INVENTOR(S) : Leonard Y. Nelson et al.

It is certified that error appears in the above-identified patent and that said Letters Patent is hereby corrected as shown below:

```
Column 3, line 36:  after "spectral" insert --emission and--
Column 4, line 14:  after "the" (second occurrence) insert --red--
Column 9, line 49:  "transpaent" should be --transparent--
```

Signed and Sealed this

Fifth Day of February, 1991

Attest:

HARRY F. MANBECK, JR.

Attesting Officer

Commissioner of Patents and Trademarks